(12) United States Patent  
Christian

(10) Patent No.: US 11,015,778 B2  
(45) Date of Patent: May 25, 2021

(54) SYSTEM FOR COMMUNICATING FROM A VEHICLE

(71) Applicant: Eric Christian, Washington, DC (US)

(72) Inventor: Eric Christian, Washington, DC (US)

( * ) Notice: Subject to any disclaimer, the term of this patent is extended or adjusted under 35 U.S.C. 154(b) by 0 days.

(21) Appl. No.: 15/917,479

(22) Filed: Mar. 9, 2018

(65) Prior Publication Data

US 2019/0277471 A1 Sep. 12, 2019

(51) Int. Cl.

| | | |
|---|---|---|
| *F21S 41/14* | (2018.01) | |
| *B60Q 1/26* | (2006.01) | |
| *B60Q 1/34* | (2006.01) | |
| *H05B 33/08* | (2020.01) | |
| *F21S 43/14* | (2018.01) | |
| *F21S 45/10* | (2018.01) | |
| *B60Q 1/46* | (2006.01) | |
| *H05B 45/20* | (2020.01) | |

(52) U.S. Cl.  
CPC .............. *F21S 43/14* (2018.01); *B60Q 1/268* (2013.01); *B60Q 1/2696* (2013.01); *B60Q 1/34* (2013.01); *B60Q 1/46* (2013.01); *F21S 45/10* (2018.01); *H05B 45/20* (2020.01)

(58) Field of Classification Search  
CPC .......... B60Q 1/46; B60Q 1/268; B60Q 1/302; B60Q 1/38  
See application file for complete search history.

(56) References Cited

U.S. PATENT DOCUMENTS

| | | | |
|---|---|---|---|
| 3,317,906 A | 5/1967 | Baldridge | |
| 4,488,141 A | 12/1984 | Ohlenforst et al. | |
| 5,839,231 A | 11/1998 | Gebhart et al. | |
| 8,606,430 B2* | 12/2013 | Seder ..................... | B60Q 1/268 340/425.5 |
| 9,248,778 B2* | 2/2016 | Ford ..................... | B60Q 1/2611 |
| 9,573,516 B2* | 2/2017 | Salter ..................... | F21S 43/13 |
| 2010/0292886 A1* | 11/2010 | Szczerba .............. | G01C 21/365 701/31.4 |
| 2012/0089273 A1* | 4/2012 | Seder ..................... | B60Q 1/268 701/2 |
| 2015/0138817 A1* | 5/2015 | Salter ..................... | F21S 43/13 362/510 |
| 2017/0327031 A1* | 11/2017 | Bauerle ............. | B32B 17/10036 |
| 2018/0268701 A1* | 9/2018 | Sato ....................... | B60K 35/00 |

\* cited by examiner

*Primary Examiner* — Joseph L Williams  
(74) *Attorney, Agent, or Firm* — Runyan Law; Charles Runyan

(57) ABSTRACT

A vehicle indication alert system for improving vehicle visibility for pedestrians and other motorists. The vehicle indication alert system increases the number of turn indicators on a vehicle, so the direction of the turn is more accurately known. The indicators are built directly into a vehicle windshield at the time of manufacture, and alternatively, are added as an after-market feature to an existing vehicle windshield.

20 Claims, 5 Drawing Sheets

SYSTEM FOR COMMUNICATING FROM A VEHICLE

BACKGROUND OF THE INVENTION

The following includes information that may be useful in understanding the present disclosure. It is not an admission that any of the information provided herein is prior art, or material, to the presently described or claimed inventions, or that any publication or document that is specifically or implicitly referenced is prior art.

1. Field of the Invention

The present disclosure relates generally to the field of indication alerts and more specifically relates to a vehicle indication alert.

2. Description of Related Art

Turn signals are blinking lamps mounted near the left and right front and rear corners of a vehicle, and sometimes on the sides, activated by the driver on one side of the vehicle at a time to advertise intent to turn or change lanes towards that side. In most countries, cars must be equipped with side-mounted turn signal repeaters to make the turn indication visible laterally in conjunction to the front and rear of the vehicle. The front amber side marker lights may be wired to flash with the turn signals as well. In recent years, many automakers have been incorporating side turn signal devices into the side-view mirror housings, rather than mounting them on the vehicle's fenders. Turn signals are required to blink on and off/flash at a steady rate of between 60 and 120 blinks per minute. Turn signals are in almost every case activated by a horizontal lever protruding from the side of the steering column, though on some vehicles it protrudes from the dashboard. The outboard end of the lever is pushed clockwise (relative to the steering column) to activate the right turn signals, or counter-clockwise for the left turn signals.

Several attempts have been made to solve the above-mentioned problems such as those found in U.S. Pat. No. 4,488,141 to Ohlenforst et al., U.S. Pat. No. 5,839,231 to Gebhart et al., and U.S. Pat. No. 3,317,906 to Baldridge. This art is representative of indication alerts. However, none of the above references, taken either singly or in combination, is seen to describe the invention as claimed.

BRIEF SUMMARY OF THE INVENTION

In view of the foregoing disadvantages inherent in the known indication alert art, the present disclosure provides a novel vehicle indication alert. The general purpose of the present disclosure, which will be described subsequently in greater detail, is to provide a further visual indication by way of a vehicle windshield in addition to standard turn signal options.

A vehicle indication alert system is disclosed herein, in a preferred embodiment, comprising a system for communicating from a vehicle, the vehicle including at least one windshield and at least one signaling device. The vehicle includes a battery, and the power supply may be selectably electrically coupled to the battery. The system may be original equipment included with the vehicle. Alternately, the system may be after-market equipment which may be added to the vehicle. At least one light source may be fixed to at least one windshield, with at least one light source configured to emit an indication light to persons outside of the vehicle.

The light source may be at least partially embedded in at least one windshield, and the light source may be configured to selectably indicate a left turn intent or a right turn intent, in response to a left turn selection or a right turn selection of the signaling device, respectively. The vehicle may also include a front-windshield and a rear-windshield, and wherein the light source may be configured to selectably indicate the left turn intent and the right turn intent, on both the front-windshield and the rear-windshield, respectively. The system may further include a color selector configured to modify a color of the indication light emitted to persons outside of the vehicle by at least one light source. Alternately, the color selector may be located and controlled independently of the signaling device.

According to another embodiment, a method for using vehicle indication alert system is also disclosed herein. The method for providing a vehicle indication alert includes the steps of: installing at least one wiring harness, installing at least one surface mount LED array, installing at least one color selector, activating/deactivating an indication light, and selecting a color.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein. The features of the disclosure believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate embodiments and methods of use for the present disclosure, a vehicle indication alert, constructed and operative according to the teachings of the present disclosure.

The various embodiments of the present disclosure will hereinafter be described in conjunction with the appended drawings, wherein like designations denote like elements.

DETAILED DESCRIPTION

As discussed above, embodiments of the present disclosure relate to an indication alert and more particularly to a vehicle indication alert system as used to improve the visual indication of a turning vehicle mounted on a windshield in addition to standard turn signal options. The present disclosure may provide significant improvements and serves as a vehicle indication alert. Preferably, an indication alert should provide further visual indication by way of a vehicle windshield, in addition to standard turn signal options, and yet would operate reliably and be manufactured at a modest expense. Thus, a need exists for a reliable vehicle indication alert system to avoid the above-mentioned problems.

Figure 1:
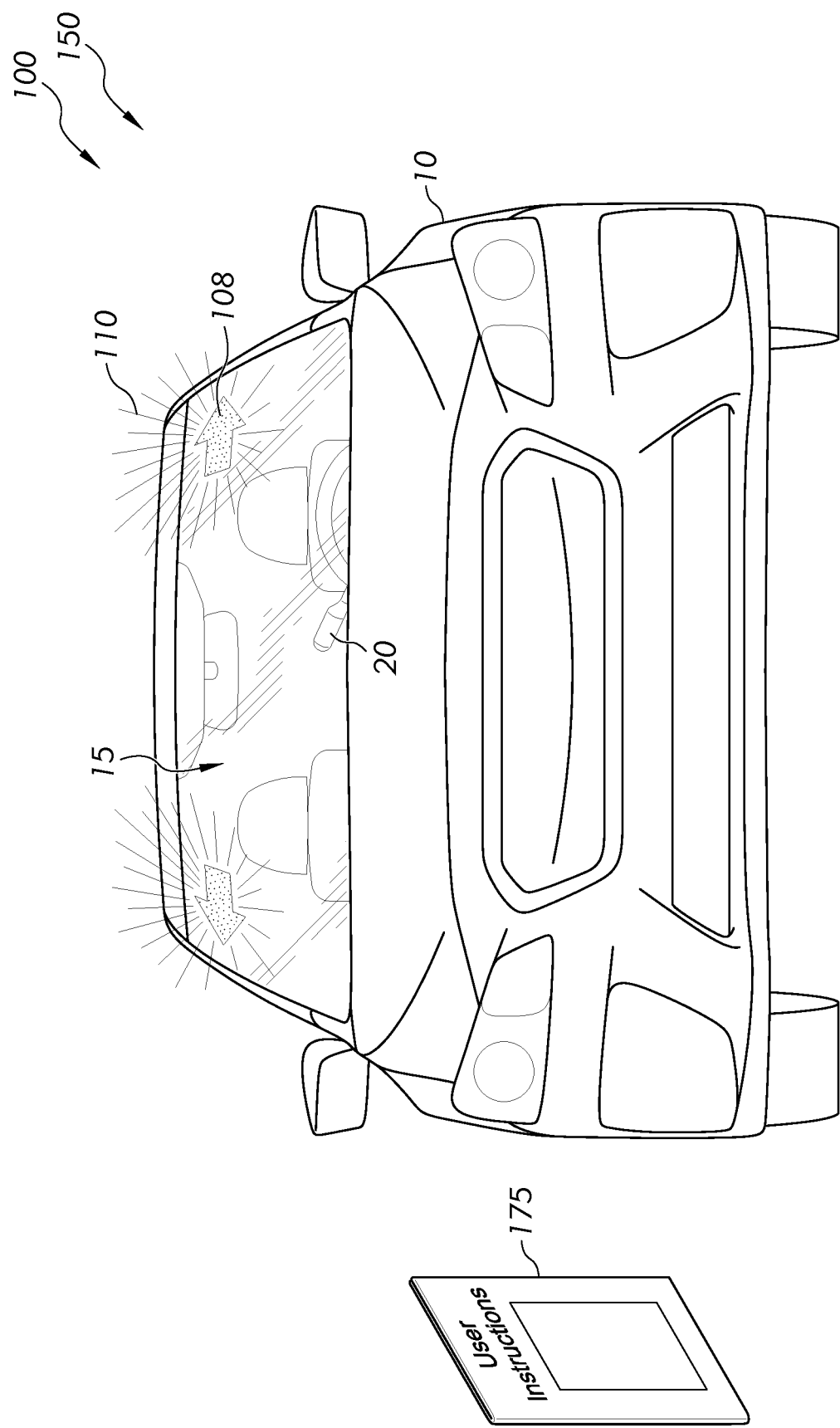
FIG. 1 is a front view illustrating a vehicle indication alert system during an 'in-use' condition, according to an embodiment of the disclosure.
Figure 2:
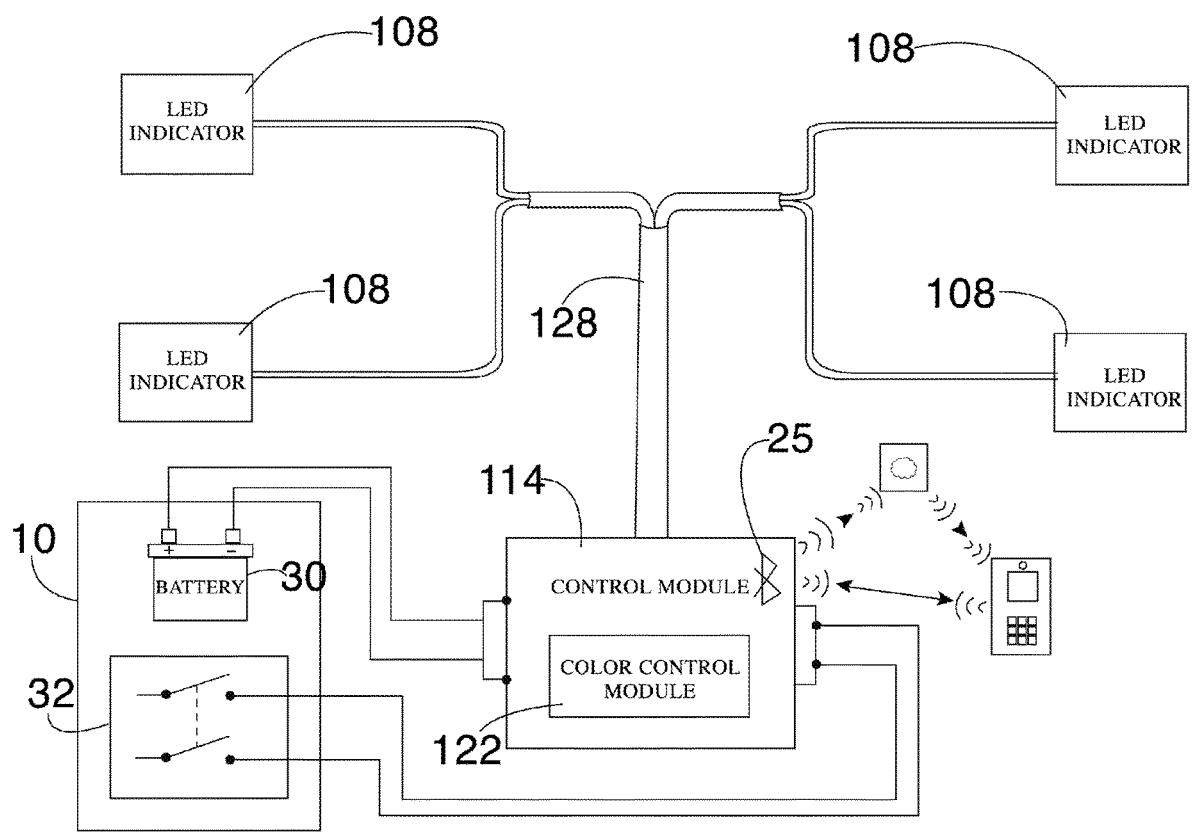
FIG. 2 is a schematic block diagram of the vehicle indication alert system, according to an embodiment of the disclosure.

Referring now to the drawings by numerals of reference, there is shown in FIGS. 1-4, various views of vehicle indication alert system 100 for communicating from a vehicle 10. FIG. 1 is a front view illustrating the vehicle indication alert system 100 during an 'in-use' condition 150, according to an embodiment of the disclosure. The vehicle 10 includes at least one windshield 15, and at least one signaling device 20. The vehicle 102 may further include at least one battery 116. The vehicle indication alert system 100 may include at least one light source 108, a power supply 112 (FIG. 2), and a controller 114 (FIG. 2). The at least one light source 108 may be fixed to the at least one windshield 15, the at least one light source 108 may be configured to emit an indication light 110 to persons outside of the vehicle. The vehicle indication alert system 100 may be original equipment of vehicle 10. Vehicle indication alert system 100 may be after-market equipment of vehicle 10.

FIG. 2 is a schematic block diagram of the vehicle indication alert system 100, according to an embodiment of the disclosure. As shown, the vehicle 10 may include a battery 30. Also as shown, the power supply 112 may be selectably electrically coupled to the battery 30 such that the battery 30 powers the vehicle indication alert system 100. The power supply 112 may be configured to power the at least one light source 108. The at least one light source 108 may be connected to the power supply 112 and the controller 114 via a wiring harness 128 and alternately the light source is configured for wireless communication via BLUETOOTH technology with an external mobile device 25 for communicating information thereto. The external mobile device 25 may comprise a smart phone, tablet, laptop computer, in-dash unite, and/or the like.

The controller 114 may be configured to operate the at least one light source 108 in conjunction with the at least one signaling device 20. For example, normal operation of the at least one signaling device 20 (e.g., turning on a L/R blinker) may command a corresponding indication by the at least one light source 108. The controller 114 may reside or otherwise be embedded in one or more components of the vehicle 10 or may remain a stand-alone device.

The vehicle indication alert system 100 may further include a color selector (such as color control module 122) configured to modify a color of the indication light 110 (FIG. 1) emitted to persons outside of vehicle 10 by the at least one light source 108. The color control module 122 may be located and controlled independently of at least one signaling device 20. For example, the at least one signaling device 20 may include a traditional turn signal and hazard flasher.

According to one embodiment, the controller 114 may be configured to operate the at least one light source 108 automatically upon detection of an impact corresponding to a minor collision. For example, upon detection of an impact, the controller 114 may be configured to operate the at least one light source 108 in a manner corresponding to turning on the hazard lights. Similarly the controller 114 may be configured to operate the at least one light source 108 automatically in conjunction with manual operation of the hazard flashers.

Figure 3:
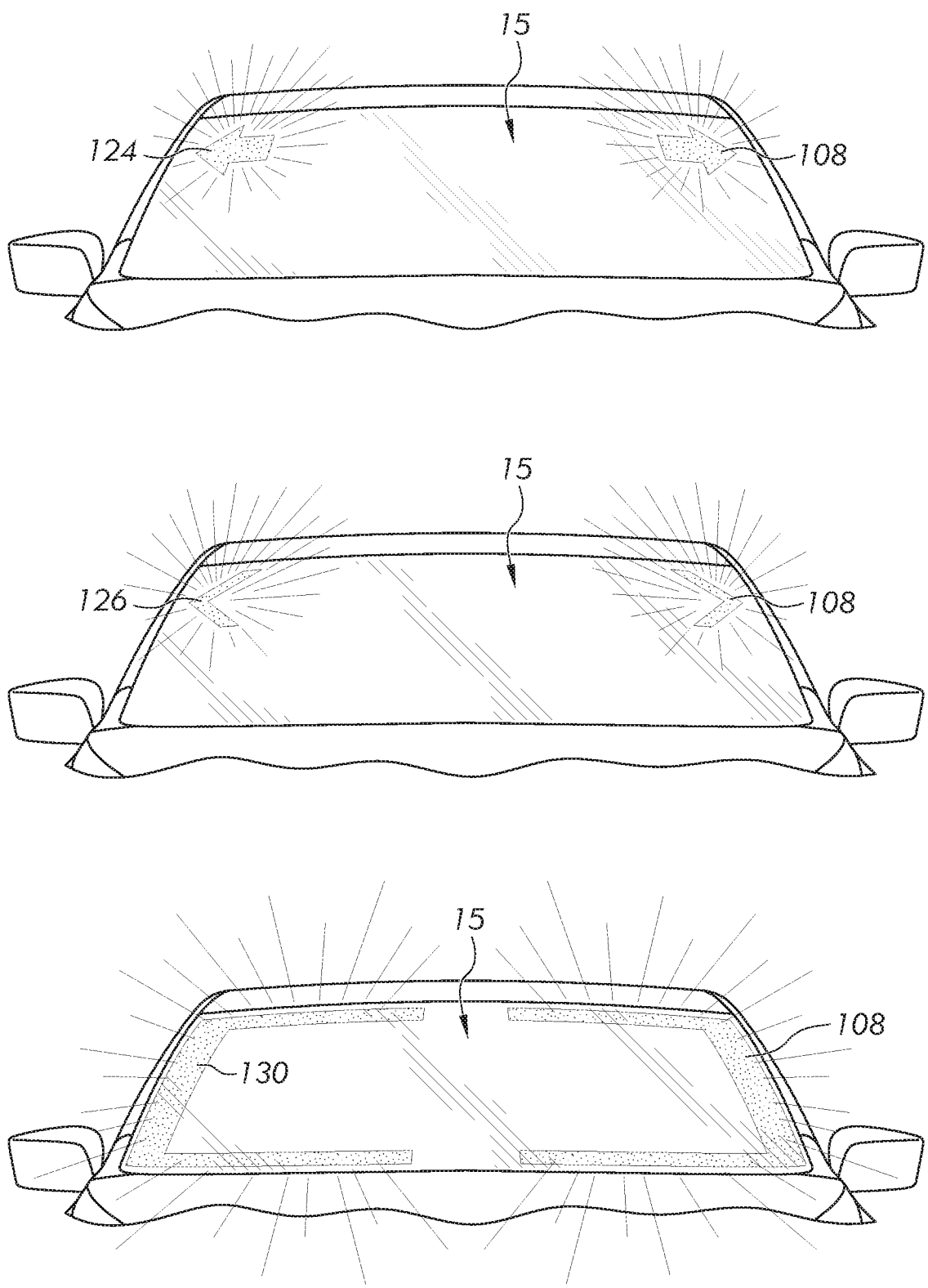
FIG. 3 is a front view, illustrating the vehicle indication alert assembly, according to various embodiments of the present disclosure.

FIG. 3 is a front view, illustrating the vehicle indication alert assembly, according to various embodiments of the present disclosure. According to one embodiment, the at least one light source 108 may include at least one surface mount LED array. Moreover the at least one light source 108 may be at least partially embedded in at least one windshield 15.

Figure 4:
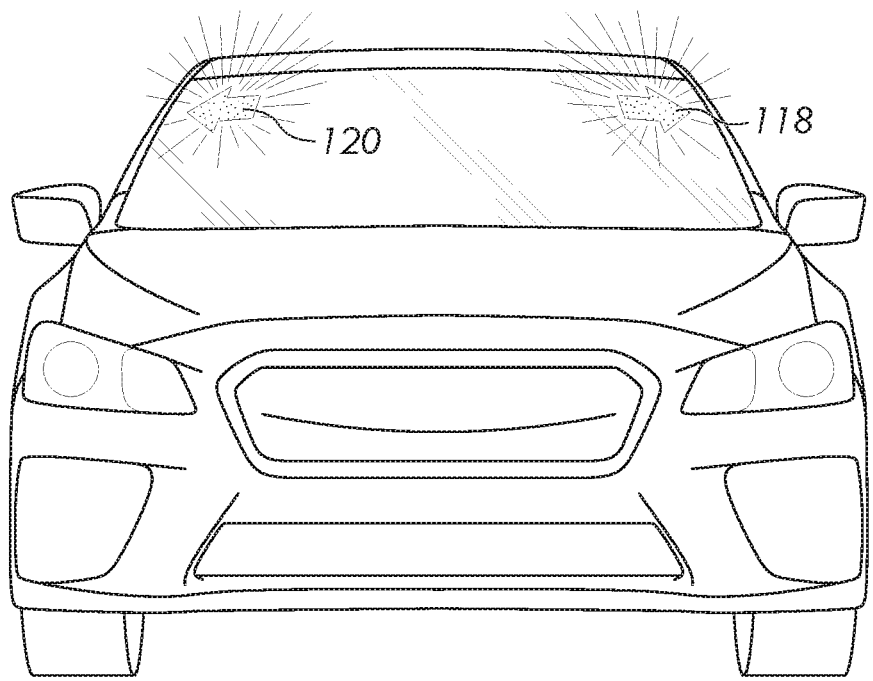
FIG. 4 is a forward and aft view of the vehicle indication alert assembly, according to an embodiment of the present disclosure.
Figure 4:
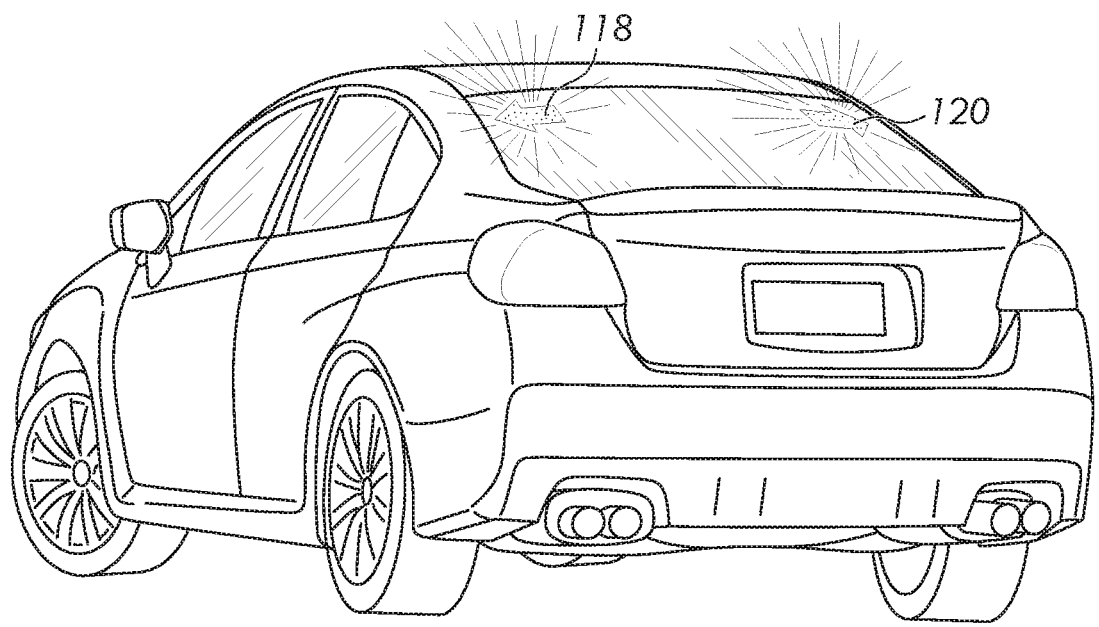

FIG. 4 is a forward and aft view of the vehicle indication alert assembly, according to an embodiment of the present disclosure. The design of the indicator as well as the color may be are customizable, and the indicators may be shown in all four corners of the front and rear windshields. In particular, the at least one light source 108 may be configured to selectably indicate a left turn intent 118 and a right turn intent 120, in response to a left turn selection and a right turn selection of at least one signaling device 20, respectively. The at least one windshield 15 may include both a front-windshield and a rear-windshield. As such, the at least one light source 108 may be configured to selectably indicate left turn intent 118 and right turn intent 120, on both the front-windshield and the rear-windshield, respectively.

Returning to FIG. 3, the at least one light source 108 may be take a variety of forms for to emitting the indication light 110 or otherwise communicating driver intent. In particular, the at least one light source 108 may be further configured in at least one of an arrowhead design 124, a carat design 126, and an edge (or U-shape) design. In this way, driver intent may be more clearly indicated. The at least one light source 108 may be further configured to emit the indication light 110 in a pattern customizable by the user. According to one embodiment, the t least one light source 108 may be further configured to direct light emissions outwardly from vehicle 10 (e.g., using reflective or opaque materials to prevent the indication light 110 from entering though the windshield 15. Further, the at least one light source 108 may include shatter resistant material.

The light source may be further configured to emit the indication light in at least one of an arrowhead design and alternately, a carat design. The light source may be further configured to emit the indication light in a pattern that may be customizable by a user. The signaling device may include a turn signal and a hazard flasher. The controller for the hazard flasher may be configured to operate light source automatically upon detection of an impact corresponding to a minor collision. Similarly, operation of the light source when operated in conjunction with the hazard flasher, the light source may direct light emissions outwardly from the vehicle. The light source may include shatter resistant material. A power supply 112 may be configured to power the light source, wherein the light source may include at least one surface mount LED array. A controller may be configured to operate the light source in conjunction with at least one signaling device.

Vehicle indication alert system 100 may be sold as a kit comprising the following parts: at least one at least one surface mount LED array; at least one at least one wiring harness 128; at least one at least one color selector 122; and at least one set of user instructions. The kit has instructions such that functional relationships are detailed in relation to the structure of the disclosure (such that the disclosure can be used, maintained, or the like in a preferred manner).

Vehicle indication alert system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Generally speaking, additional safety features can help keep motorists and pedestrians safer. Advantageously, the vehicle indication alert system 100 may provide a visual indicator in the event another vehicle is traveling too close to see the traditional turn signals included with the vehicle 10. The indicator lights 108 may appear in the upper and lower quadrants of the vehicle windshield, operating in conjunction with the other turn signal indicators.

Figure 5:
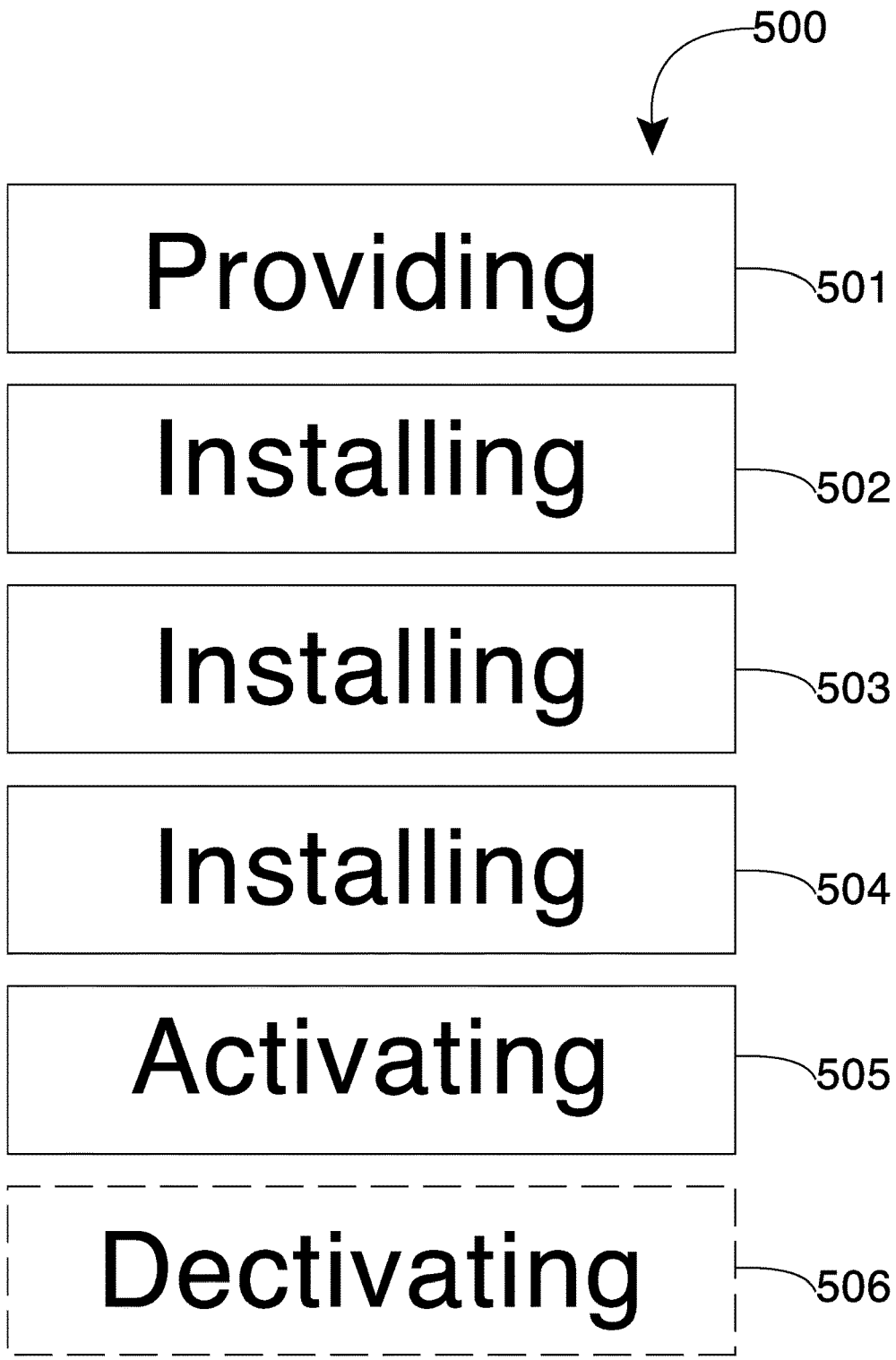
FIG. 5 is a flow diagram illustrating a method of use for the vehicle indication alert system according to an embodiment of the present disclosure.

Referring now to FIG. 5 showing a flow diagram illustrating method of use 500 for vehicle indication alert system 100 according to an embodiment of the present disclosure of FIGS. 1-4. As shown, method of use 500 may include the steps of: step one 501, providing system for communicating from a vehicle; step two 502, installing at least one wiring harness; step three 503, installing at least one surface mount LED array; step four 504, installing at least one color selector; step five 505, activating an indication light; and step six 506, deactivating an indication light.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A system for communicating from a vehicle, the vehicle including at least one windshield and at least one signaling device, the system comprising:
   at least one light source fixed to the at least one windshield, said at least one light source configured to emit an indication light to persons outside of the vehicle;
   a power supply configured to power the at least one light source;
   and
   a controller configured to operate the at least one light source in conjunction with the at least one signaling device.

2. The system of claim 1, wherein the at least one light source is configured for wireless communication with an external mobile device for communicating information thereto.

3. The system of claim 1, wherein the vehicle includes a battery; and wherein the power supply is selectably electrically coupled to the battery.

4. The system of claim 1, wherein the at least one light source includes at least one surface mount LED array.

5. The system of claim 1, wherein the at least one light source is at least partially embedded in the at least one windshield.

6. The system of claim 5, wherein the at least one windshield includes a front-windshield and a rear-windshield; and
   wherein the at least one light source is configured to selectably indicate the left turn intent and the right turn intent, on both the front-windshield and the rear-windshield, respectively.

7. The system of claim 1, wherein the at least one light source is configured to selectably indicate a left turn intent and a right turn intent, in response to a left turn selection and a right turn selection of the at least one signaling device, respectively.

8. The system of claim 1, further comprising a color selector configured to modify a color of the indication light emitted to persons outside of the vehicle by the at least one light source.

9. The system of claim 8, wherein said color selector is located and controlled independently of the at least one signaling device.

10. The system of claim 9, wherein the controller is configured to operate the at least one light source automatically upon detection of an impact corresponding to a minor collision, and similarly to operation of the at least one light source when operated in conjunction with the hazard flasher.

11. The system of claim 1, wherein the at least one signaling device includes a turn signal and a hazard flasher.

12. The windshield indication system of claim 1, wherein the at least one light source is further configured to emit the indication light in at least one of an arrowhead design and a carat design.

13. The system of claim 1, wherein the at least one light source is further configured to emit the indication light in a pattern that is customizable by a user.

14. The system of claim 1, wherein the at least one light source is further configured to direct light emissions outwardly from the vehicle.

15. The system of claim 1, wherein the at least one light source includes shatter resistant material.

16. The system of claim 1 wherein the at least one light source is electrically connected to the battery.

17. The system of claim 1 wherein the at least one light source is electrically connected to the controller.

18. The system of claim 1 wherein the controller is a stand-alone device.

19. A system for communicating from a vehicle, the system comprising:
   a power supply;
      wherein the vehicle includes a battery;
      and
      wherein the power supply is selectably electrically coupled to the battery, which is then configured to power at least one light source;
   at least one light source;
      wherein the at least one light source is configured to emit an indication light to persons outside of the vehicle by selectably indicating a left turn intent and a right turn intent, in response to a left turn selection and a right turn selection of the at least one signaling device, respectively, wherein the at least one light source is further configured to direct light emissions outwardly from the vehicle, wherein the at least one light source includes at least one surface mount LED array, which is at least partially embedded in at least one windshield, wherein the at least one light source includes shatter resistant material, wherein the at least one windshield includes a front-windshield and a rear-windshield; which at least one light source is configured to selectably indicate the left turn intent and the right turn intent, on both the front-windshield and the rear-windshield, respectively; additionally, the at least one light source is further configured to emit the indication light in at least one of an arrowhead design, and a carat design; the at least one light source even further includes a color selector which is configured to modify a color of the indication light emitted to persons outside of the vehicle by the at least one light source, furthermore the at least one light source is further configured to emit the indication light in a pattern that is customizable by a user, wherein the color selector is located and controlled independently of the at least one signaling device, wherein the at least one signaling device includes a turn signal and a hazard flasher, a controller; and wherein the controller is configured to operate the at least one light source in conjunction with the at least one signaling device; furthermore, the controller is configured to operate the at least one light source automatically upon detection of an impact corresponding to a minor collision, and similarly to operation of the at least one light source when operated in conjunction with the hazard flasher.

20. A method comprising the steps of:

providing directional notifications using a system including a windshield;

a signaling device;

a light source fixed to the windshield;

a power supply configured to power the light source; and a controller configured to operate the light source with the signaling device, wherein the light source emits an indication light to persons outside of the vehicle;

installing a wiring harness;

installing the light source;

installing a color selector for an indication light;

activating the light source to display the indication light; and deactivating the light source.

* * * * *